(12) United States Patent
Hannon

(10) Patent No.: US 7,300,012 B1
(45) Date of Patent: Nov. 27, 2007

(54) SPINNING REEL SPOOL

(76) Inventor: Doug Hannon, 8660 Tarpon Springs Rd., Odessa, FL (US) 33556

(*) Notice: Subject to any disclaimer, the term of this patent is extended or adjusted under 35 U.S.C. 154(b) by 0 days.

(21) Appl. No.: 11/728,141

(22) Filed: Mar. 23, 2007

Related U.S. Application Data

(60) Provisional application No. 60/902,734, filed on Feb. 22, 2007.

(51) Int. Cl.
 A01K 89/01 (2006.01)
(52) U.S. Cl. .................................................. 242/322
(58) Field of Classification Search ................. 242/322
 See application file for complete search history.

(56) References Cited

U.S. PATENT DOCUMENTS

| | | | | |
|---|---|---|---|---|
| 3,298,629 A | * | 1/1967 | Small ........................ 242/230 |
| 4,076,185 A | * | 2/1978 | Dorph .................... 242/118.41 |
| 4,451,012 A | * | 5/1984 | Puryear et al. ............. 242/319 |
| 5,161,751 A | * | 11/1992 | Bolcavage .................. 242/322 |
| D353,869 S | * | 12/1994 | Park .......................... D22/137 |
| 5,697,567 A | * | 12/1997 | Sonenvald .................. 242/322 |
| 5,720,441 A | * | 2/1998 | Chamberlin et al. ........ 242/323 |

* cited by examiner

Primary Examiner—Emmanuel M Marcelo
(74) Attorney, Agent, or Firm—Arthur W. Fisher, III

(57) ABSTRACT

A spinning reel spool for use on a spinning reel including a bail to reduce friction between the spinning reel spool and fishing line during casting and eliminate the formation of fishing line 'birdnest' snarls during casting that result from fishing line loops created during retrieval of the fishing line onto the spinning reel spool following a cast, the spinning reel spool comprising a fishing line support member to spool fishing line thereon having a proximal mounting member to mount the spinning reel spool on the spinning reel and a distal fishing line retaining member including a lip formed on periphery thereof having a plurality of teeth-like members extending outwardly therefrom to form corresponding fishing line retaining grooves at the root or intersection of the leading edge of each tooth-like member and the lip formed on the periphery of the distal fishing line retaining member such that fishing line is reeled in after a cast against the outer face of the distal fishing line retaining member by the bail the fishing line may engage the leading edge of two tooth-like members and forced to the corresponding fishing line retrieving grooves drawing the fishing line against the outer face of the distal retaining member to prevent the formation of loops in the fishing line on the spinning reel spool to eliminate the formation of 'birdnest' snares during subsequent casts.

20 Claims, 6 Drawing Sheets

SPINNING REEL SPOOL

CROSS REFERENCE

This is a non-provisional application claiming priority from co-pending provisional application filed on Feb. 22, 2007, Ser. No. 60/902,734 entitled Spinning Reel Spool.

BACKGROUND OF THE INVENTION

1. Field of the Invention

A spinning reel spool for use on a spinning reel configured to eliminate "birdnest" line snarls caused by loops formed during retrieval of the fishing line as the fishing line pays out from the spinning reel spool during casting.

2. Description of the Prior Art

From time to time during the retrieval of line on a traditional spinning reel loops are formed when small increments of slack line are reeled onto the reel spool. A spinning reel spool has a spool lip with a smooth circumference where such loops often crawl together to form a hair pin or even a twisted loop that overhangs the spool lip. During a subsequent cast the line is pulled tight against the spool lip engaging the loop. The loop ultimately lifts the line spooled on top of loop from the reel spool forming a "birdnest".

As described hereinafter the present invention causes any loop to form across the face of the spool forcing the loop to exit and re-enter the spool through the paths of least resistance as a single tight loop. As a result, during a cast the line skims over the peaks formed on the spool lip never contacts the loops. Any loops then leave the spool in the normal sequence of the cast eliminating any birdnests.

U.S. Pat. No. 4,076,185 shows a conventional spinning reel having a second spool smaller in diameter attached to the outer face thereof and arranged concentrically therewith. The rear face abutts the front face of the main spool.

U.S. Pat. No. 4,451,012 relates to a spin casting fishing reel having a line spool including a flange positioned inside the spinner head. In order to prevent slack fishing line from becoming caught underneath the spinner head, the rim on the edge of the flange has a plurality of flocked fibers thereon.

U.S. Pat. No. 5,149,008 discloses a spinning reel comprising a spool rotatably supported by a spool shaft, a drag member for imparting a braking force to rotation of the spool and an adjusting member for axially pressing the drag member to thereby adjust the braking force. The spool includes a front face and an annular projection extending from the front face thereof to prevent water from entering the front face to reach the drag member.

U.S. Pat. No. 5,161,751 teaches a fishing reel of the oscillating or reciprocating spool type including a bifurcated drum separated into a large drum and a small drum. The line speed varies upon retrieval as the line is periodically or alternately switched between the different sized wind-up drums.

U.S. Pat. No. 5,697,567 shows a casting reel with a spool and a casting edge with a line guide where line is paid out from a stationary spool during casting and deflected to a direction parallel to the axis of the spool. The casting reel comprises a stationary spool carrying the line to be paid out. A casting edge member is disposed in fixed spaced relationship with the spool disposed rotatable about the spool axis. The casting edge member has a casting edge for deflecting line unwinding from the spool to the direction parallel to the longitudinal axis of the spool.

U.S. Pat. No. 5,720,441 relates to an attachment for controlling the distance of a casting lure attached to an end of a fishing line including a pressure pad extending from and connected to at least a portion of a distal lip of a spinning reel spool. During casting of the lure and line, the line on each revolution of the reel passes along an outer surface of the pressure pad such that the fisherman can press his casting finger on the line against the pressure pad with varying intermittent finger pressure to increase and decrease drag on the line as the line spools off the spool and passes over the pressure pad.

Other examples of the prior art are found in U.S. Des. 353,869; U.S. Pat. No. 2,890,842 and French No. 918,571.

SUMMARY OF THE INVENTION

The present invention relates to a spinning reel configured to eliminate the formation of fishing line 'birdnest' snarls that occasionally occur during casting when loops have been formed in the fishing line during retrieval from the preceding cast of a lure and fishing line.

The spinning reel spool of the present invention is configured for use in combination with a spinning reel.

The spinning reel comprises a body to house mechanisms that allow the spinning reel spool to spin freely to pay out the fishing line when casting and the rotate the spinning reel spool to retrieve the fishing line onto the spinning reel spool in response to the rotation of a crank handle.

The spinning reel spool comprises an intermediate interconnecting fishing line support member to store or spool the fishing line thereon having a proximal or inner hollowing coupling or mounting member to mount the spinning reel spool on the body of the spinning reel and a distal or outer fishing line retaining member to selectively retain at least a portion of the fishing line on the intermediate interconnecting fishing line support member attached to opposite end portions thereof. The distal or outer fishing line retaining member includes an interrupted outer surface or spool lip formed on the periphery thereof.

The uneven or interrupted outer surface or spool lip comprises a plurality of teeth-like members or projections that extend outwardly from the outer surface or spool lip formed on the periphery thereof such that a fishing line retaining groove or seat is formed between adjacent teeth-like members or projections.

The spinning reel includes a bail to guide the fishing line onto the intermediate interconnecting fishing line support member when retrieving the fishing line after a cast. As the bail engages the fishing line, the fishing line usually slips to either end of the bail while the fishing line is guided directed onto the intermediate interconnecting fishing line support member. Unfortunately, problems occur in about one-in-ten casts when using the typical spinning reel spool.

The fishing line is sometimes carried over the face of the distal or outer fishing line retainer member by the arc of the bail and then back over the smooth spool lip causing a loop over the end of the spool. A subsequent cast jerks or pulls the loop and over laying fishing line creating a birdnest.

With the bail in the second position, the fishing line usually slips to either end of the bail where the fishing line is guided or directed onto the intermediate interconnecting fishing line support member. Unfortunately, problems occur in about one-in-ten casts when using the typical spinning reel spool. The fishing line is sometimes carried over the outer surface the fishing reel spool and then back over the smooth outer surface or spool lip causing a loop to form over the outer end of the fishing reel spool. A subsequent cast pulls the loop and overlaying fishing line off the spinning reel spool creating a birdnest.

The interrupted outer surface or spool lip of the present invention prevents or eliminates loops from being formed when the bail pulls the fishing line over the face or outer surface of the distal or outer fishing line retainer member or disk. In particular, the teeth-like members or projecting prevent the fishing line from sliding in the direction of the reeling-on and only in the direction of the casting-off. The bail roller draws the fishing line into two of the fishing line retaining grooves or seats pulling the fishing line taut over the face or outer surface of the distal our outer fishing line retaining member or disk. As a consequence on the subsequent cast, the fishing line pays out without the potential of a birdnest since there is no loop under laying the fishing line on the interrupted outer surface or spool lip. Thus, the fishing line smoothly pays out off the spinning reel spool.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Spinning reels are designed to translate rotational movement to axial movement during casting of a fishing line and lure and to translate axial movement to rotational movement when retrieving the fishing line and lure after a cast.

The present invention relates to a spinning reel configured to eliminate the formation of fishing line birdnest snarls that occasionally occur during casting when loops have been formed in the fishing line during retrieval from the preceding cast of a lure and fishing line. The spinning reel spool also reduces the drag during casting by reducing friction between the fishing line and spinning reel spool.

Figure 1:
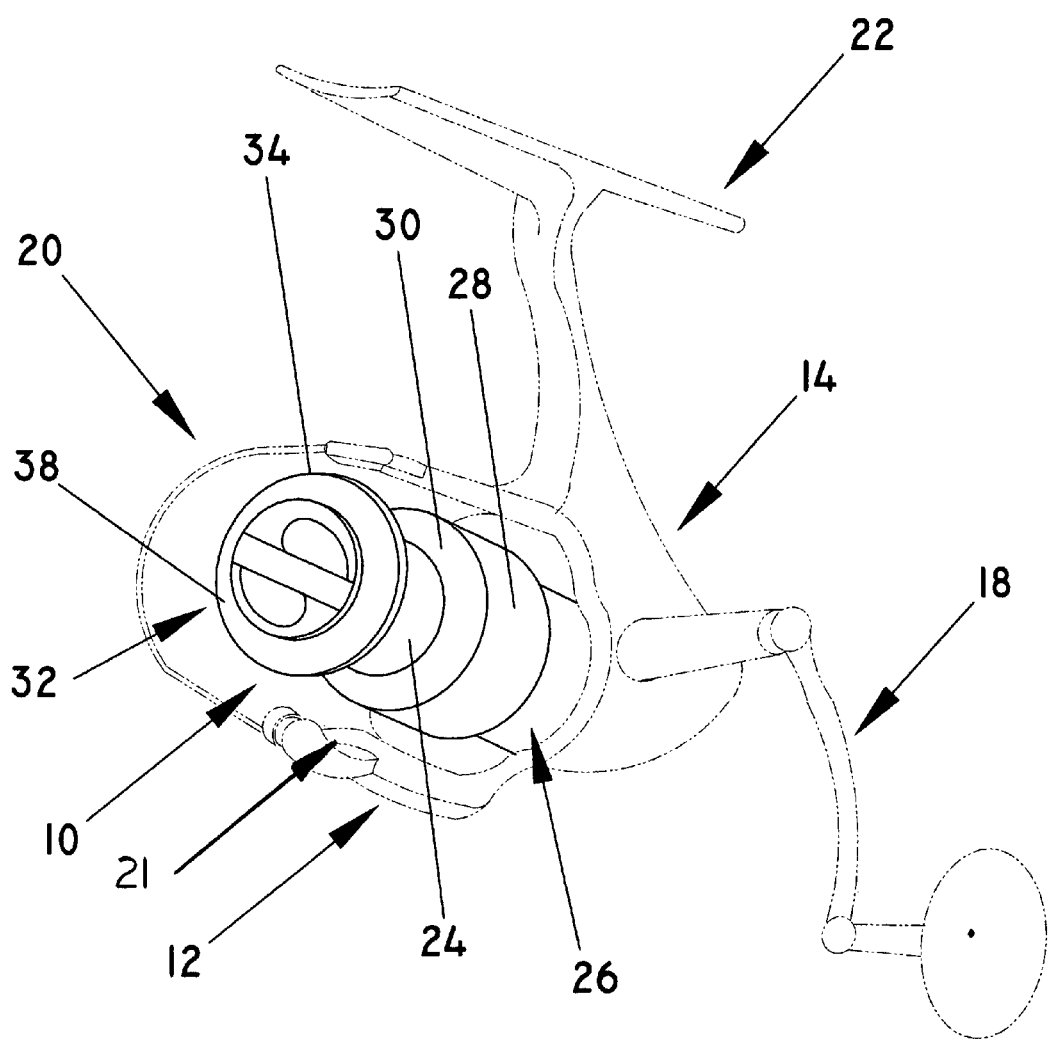
FIG. 1 is a perspective view of a spinning reel typical of the prior art.
Figure 2:
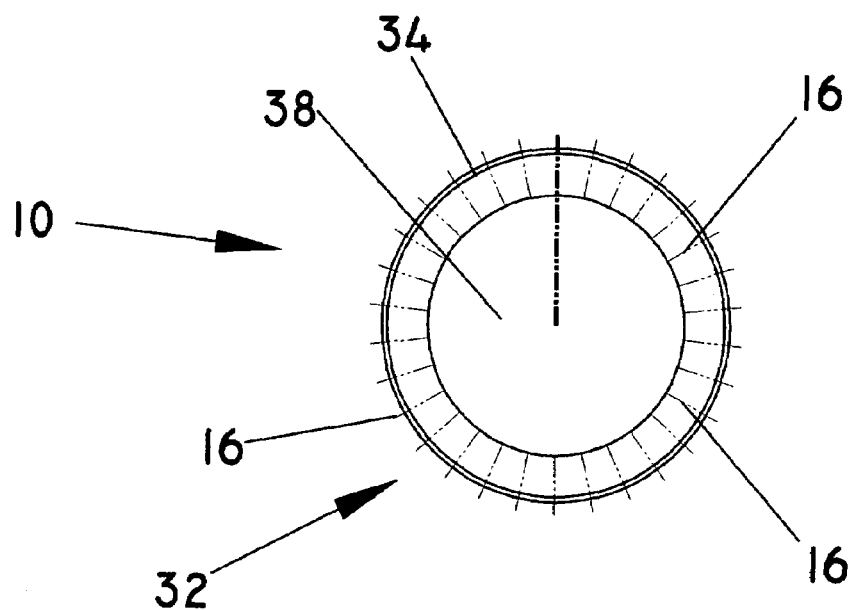
FIG. 2 is a partial front view of the spool of the spinning reel of FIG. 1.
Figure 3:
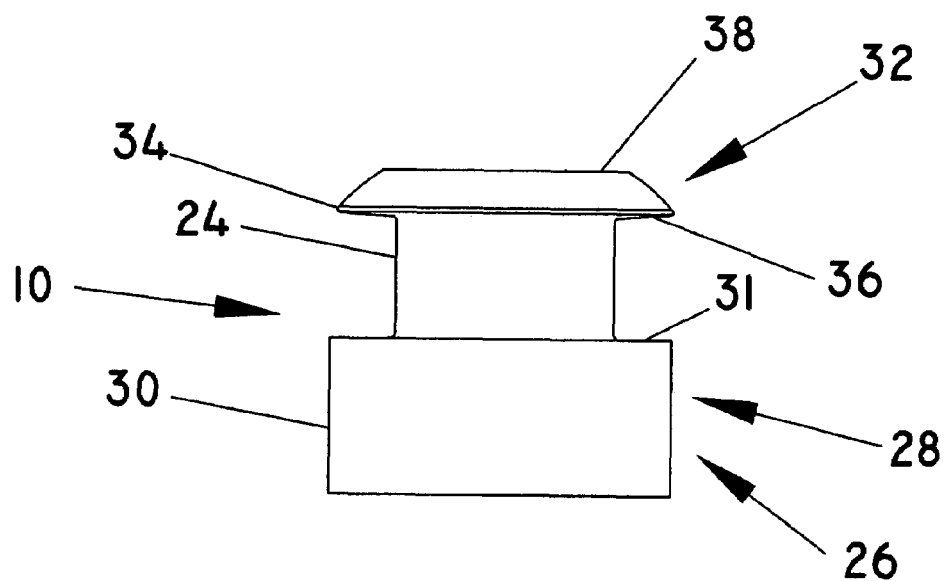
FIG. 3 is a side view of the spool of the spinning reel of FIG. 1.

FIGS. 1 through 3 show a typical spinning reel spool and spinning reel combination generally indicated as 10 and 12 respectively.

As shown in FIG. 1, the spinning reel 12 comprises a body generally indicated as 14 to house mechanisms (not shown) that allow the spinning reel spool 10 to spin freely to pay out the fishing line 16 when casting and to rotate the spinning reel spool 10 to retrieve the fishing line 16 onto the spinning reel spool 10 in response to the rotation of a crank handle generally indicated as 18 rotatably mounted on the body 14. A bail generally indicated as 20 movable between a first and second position is pivotally mounted or coupled to the body 14 to allow the fishing line 16 to be cast unobstructed when in the first position and to engage the fishing line 16 when in the second position to guide the fishing line 16 onto the spinning reel spool 10 during retrieval of the fishing line 16 and lure. The combination spinning reel spool 10 and spinning reel 12 is attached or mounted to a fishing rod (not shown) by a fishing rod attachment member generally indicated as 22.

As best shown in FIGS. 2 and 3, the spinning reel spool 10 comprises a substantially cylindrical intermediate interconnecting fishing line support member 24 to store or spool the fishing line 16 thereon having a proximal or inner hollowing coupling or mounting member generally indicated as 26 comprising a cup generally indicated as 28 including a substantially cylindrical apron or skirt 30 depending from the peripheral portion of a proximal or inner fishing line retaining member or disk 31 configured to mount or couple the spinning reel spool 10 on the body 14 of the spinning reel 12 and a distal or outer fishing line retaining member or disk generally indicated as 32 to selectively retain at least a portion of the fishing line 16 on the substantially cylindrical intermediate interconnecting fishing line support member 24. The distal or outer fishing line retaining member or disk 32 includes a substantially smooth outer surface or lip 34 formed on the periphery thereof extending between the inner surface 36 and outer surface 38 thereof.

Figure 4:
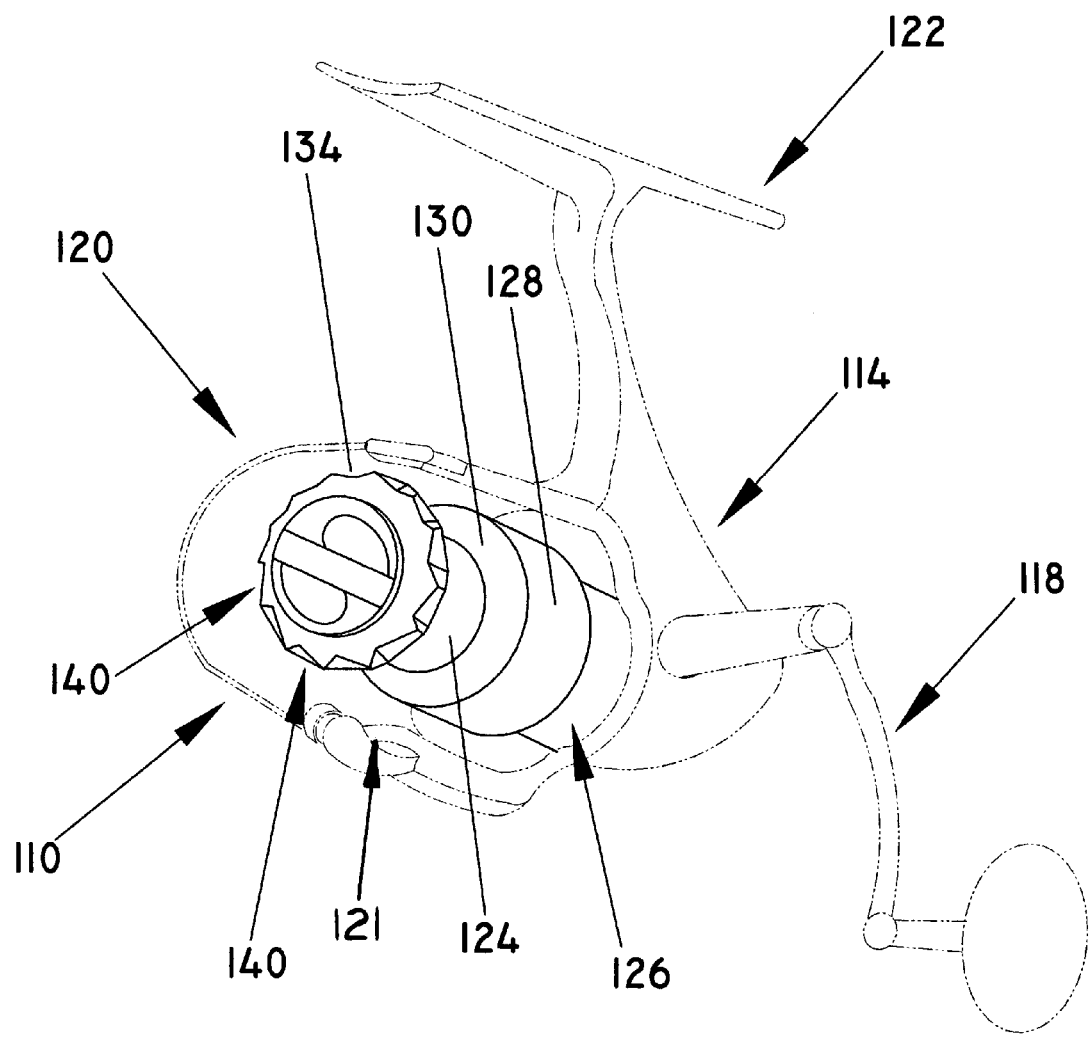
FIG. 4 is a perspective view of the spinning reel of the present invention.
Figure 5:
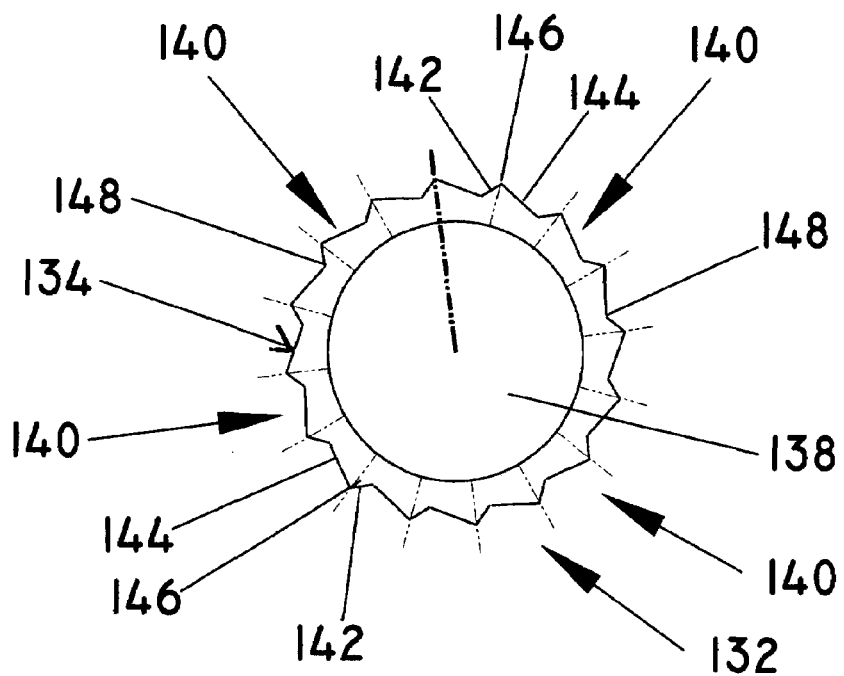
FIG. 5 is a partial front view of the spool of the spinning reel of the present invention.
Figure 6:
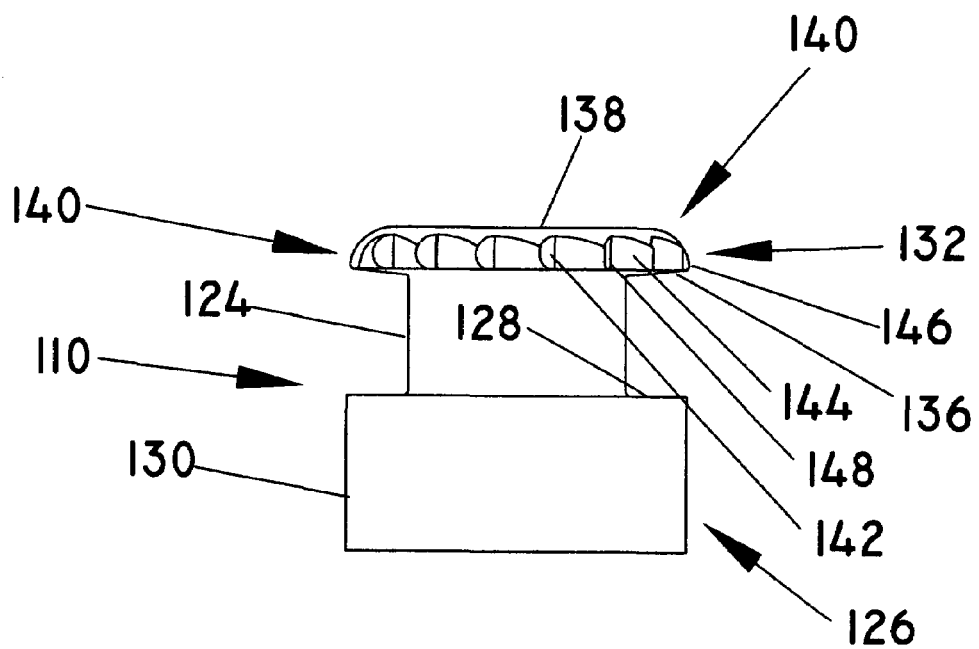
FIG. 6 is a side view of the spool of the present invention.
Figure 7:
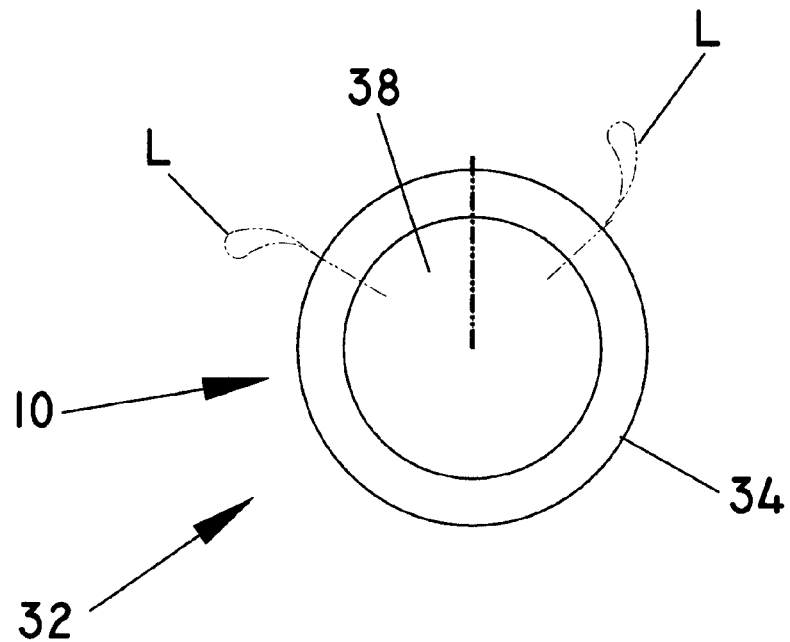
FIG. 7 is a partial front view of the spool of the spinning reel of FIG. 1.
Figure 8:
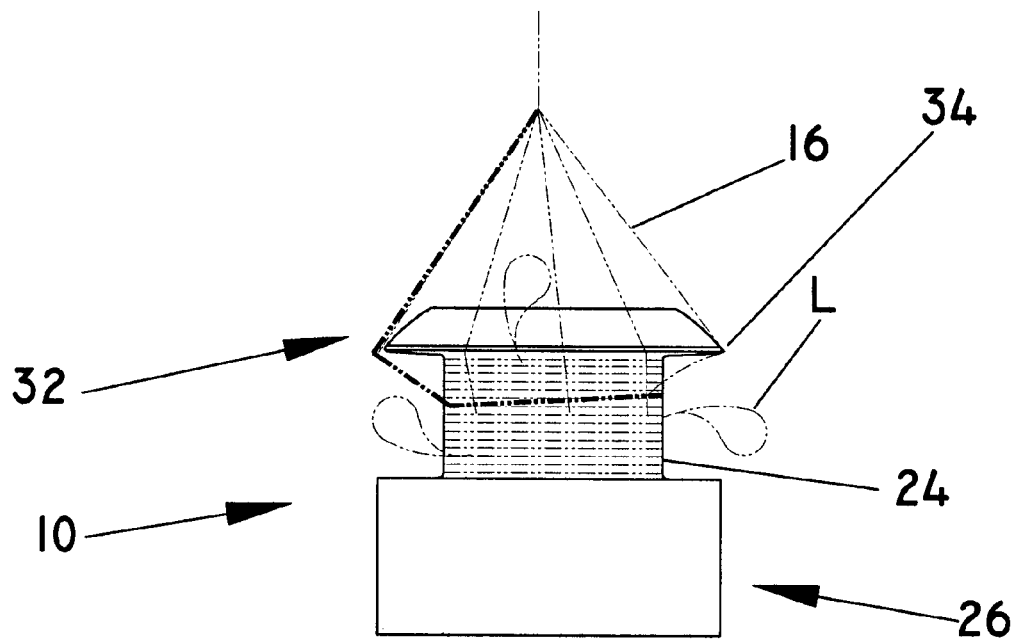
FIG. 8 is a side view of the spool of the spinning reel of FIG. 1 depicting line loops formed upon retrieval after casting.
Figure 9:
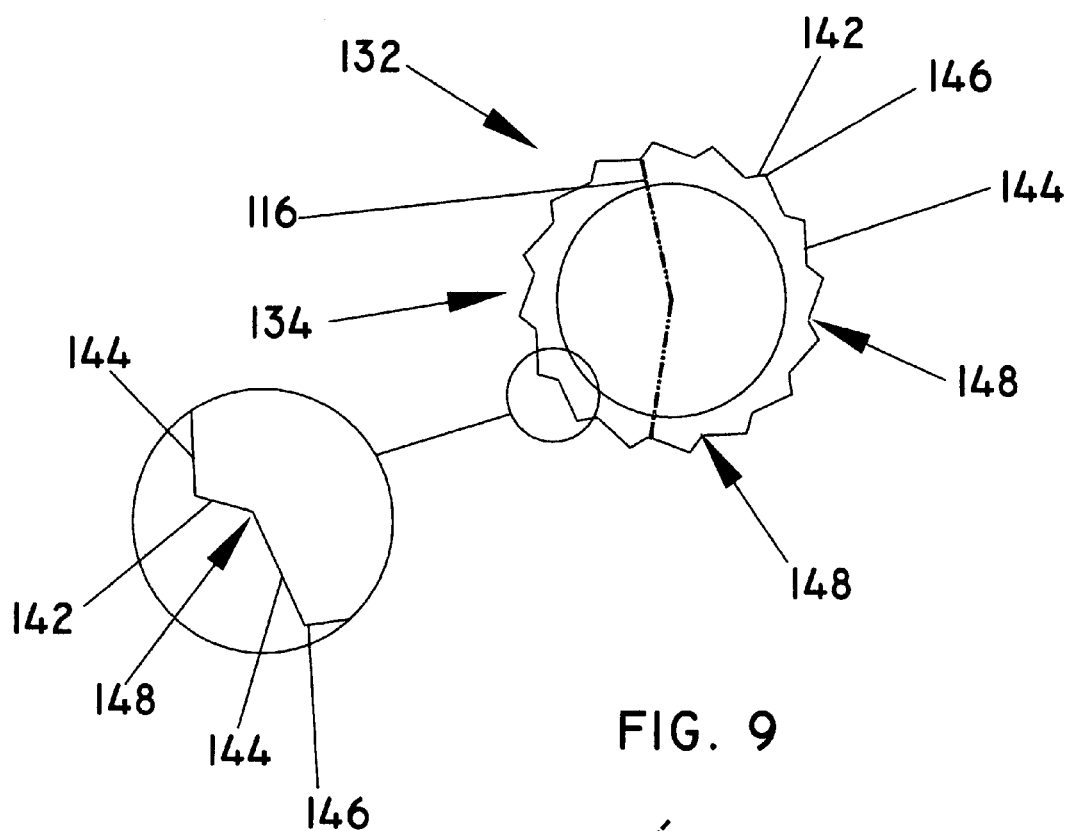
FIG. 9 is a partial front view of the spool of the spinning reel of the present invention depicting line loops formed upon retrieval after casting.
Figure 10:
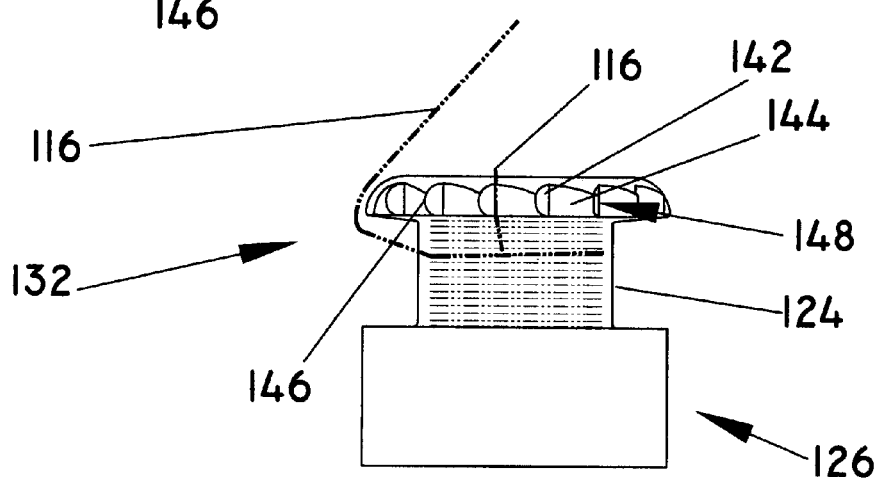
FIG. 10 is a side view of the spool of the present invention depicting line loops formed upon retrieval after casting.

FIGS. 4 through 6 show the spinning reel spool 110 of the present invention and in combination with a spinning reel 112.

The spinning reel 112 comprises a body generally indicated as 114 to house mechanisms (not shown) that allow the spinning reel spool 110 to spin freely to pay out the fishing line 116 when casting and to rotate the spinning reel spool 110 to retrieve the fishing line 116 onto the spinning reel spool 110 in response to the rotation of a crank handle generally indicated as 118 rotatably mounted on the body 114. A bail generally indicated as 120 movable between a first and second position is pivotally mounted or coupled to the body 114 to allow the fishing line 116 to be cast unobstructed when in the first position and to engage the fishing line 116 when in the second position to guide the fishing line 116 onto the spinning reel spool 110 during retrieval of the fishing line. The combination spinning reel spool 110 and spinning reel 112 is attached or mounted to a fishing rod (not shown) by a fishing rod attachment member generally indicated as 122.

As best shown in FIGS. 5 and 6, the spinning reel spool 110 of the present invention comprises a substantially cylindrical intermediate interconnecting fishing line support member 124 to store or spool the fishing line 116 thereon having a proximal or inner hollowing coupling or mounting member generally indicated as 126 comprising a cup generally indicated as 128 including a substantially cylindrical apron or skirt 130 depending from the peripheral portion of a proximal or inner fishing line retaining member or disk 131 configured to mount or couple the spinning reel spool 110 on the body 114 of the spinning reel 112 and a distal or outer fishing line retaining member or disk generally indicated as 132 to selectively retain at least a portion of the fishing line 116 on the substantially cylindrical intermediate interconnecting fishing line support member 124 attached to opposite ends thereof. The distal or outer fishing line retaining member or disk 132 includes an interrupted outer surface or spool lip 134 formed on the periphery thereof extending between the inner surface 136 and outer surface 138 thereof.

The improvement of the present invention resides at least, in part, to the uneven or interrupted outer surface or spool lip 134. Specifically, a plurality of teeth-like members or projections each generally indicated as 140 extend outwardly from the interrupted outer surface or spool lip 134 formed on the periphery thereof. The outer surface or spool lip 134 extends between the inner surface 136 and outer surface 138 of the distal or outer fishing line retainer member or disk 132. Each tooth-like member or projection 140 comprises an inclined leading edge 142 and an arcuate trailing edge 144 that cooperatively form an apex or tip 146. The inclined leading edge 142 and the arcuate trailing edge 144 of adjacent teeth-like members or projections 140 intersect to cooperatively form a corresponding fishing line retaining groove or seat 148. In other words, a fishing line retaining groove or seat 148 is formed on the uneven or interrupted outer surface of spool lip 134 between adjacent teeth-like member or projections 140.

The use and operation of a typical spinning reel spool 10 and spinning reel 12 combination and the spinning reel spool 110 of the present invention in combination with a spinning reel 112 is best understood with reference to FIGS. 7 and 8, and FIGS. 9 and 10 respectively.

Specifically, the friction created between the spinning reel spool 110 and the fishing line 116 during casting is substantially reduced as compared to the friction created between the spinning reel spool 10 and the fishing line 16 during casting. The fishing line 116 contacting the arcuate trailing edges 144 of the teeth-like members or projections 140 effectively reduce the contact surface as the fisherman casts the lure (not shown) and the fishing line 116. This causes the fishing line to move from peak-to-peak or tip-to-tip 146 over the interrupted outer surface or spool lip 134 rather than the entire circumference of the substantially smooth outer surface or lip 34 of the typical spinning reel 10.

In addition to decreasing friction, the spinning reel spool 110 reduces snags in the fishing line 116 during casting that result in birdnest snarling experienced when loops L are formed in the fishing line 10 during retrieval of the fishing line 116 follow a cast.

With the bail 20 in the second position, the fishing line 16 usually slips to either end of the bail 20 where the fishing line 16 is guided or directed onto the substantially cylindrical intermediate interconnecting fishing line support member 24. Unfortunately, problems occur in about one-in-ten casts when using the typical spinning reel spool 10. The fishing line 16 is sometimes carried over the outer surface 38 of the distal or outer fishing line retainer member or disk 32 of the fishing reel spool 10 by the arc of the bail 20 and then back over the smooth outer surface or spool lip 34 causing a loop L to form over the outer end of the fishing reel spool 10. Since there is no friction without the pull of a cast on a smooth, round lip, the line memory and twist cause the loop L to hang, hairpin-fashioned over the smooth outer surface or spool lip 34 of the spinning reel spool 10. A subsequent cast pulls the loop L and overlaying fishing line 16 off the spinning reel spool 10 creating a birdnest.

The interrupted outer surface or spool lip 134 of the present invention prevents or eliminates loops L from being formed when the bail 120 pulls the fishing line 116 over the face or outer surface 38 of the distal or outer fishing line retainer member or disk 132. In particular, the teeth-like members or projecting 140 prevent the fishing line 116 from sliding in the direction of the reeling-on and only in the direction of the casting-off. The bail roller 121 draws the fishing line 116 into two of the fishing line retaining grooves or seats 148 pulling the fishing line 116 taut over the face or outer surface 138 of the distal our outer fishing line retaining member or disk 132. As a consequence on the subsequent cast, the fishing line 116 pays out without the potential of a birdnest since there is no loop L under laying the fishing line 116 on the interrupted outer surface or spool lip 134. Thus, the fishing line 116 smoothly pays out off the spinning reel spool 110.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A spinning reel spool for use on a spinning reel including a bail to guide the fishing line onto said spinning reel spool to reduce friction between the spinning reel spool and fishing line during casting and eliminate the formation of fishing line 'birdnest' snarls during casting that result from fishing line loops created during retrieval of the fishing line onto the spinning reel spool following a cast, said spinning reel spool comprising an intermediate fishing line support member to spool fishing line thereon having a proximal coupling member configured to mount said spinning reel spool on the spinning reel and a distal fishing line retaining member including an outer face and an outer surface formed on periphery thereof formed rearwardly of said outer face and having a plurality of teeth-like members extending outwardly therefrom to form a corresponding fishing line retaining seat at the intersection of each tooth-like member and said outer surface formed on said periphery of said distal fishing line retaining member coupled to opposite end portions of said intermediate fishing line support such that when fishing line is reeled in after a cast the fishing line can be drawn over said outer face of said distal fishing line retaining member by the bail when the fishing line engages the center portion of the bail whereby the fishing line engages two of said tooth-like members and is drawn into the corresponding fishing line retaining seats pulling the fishing line against said outer face of said distal fishing line retaining member to prevent the formation of loops in the fishing line on said spinning reel spool to eliminate the formation of 'birdnest' snares during the subsequent cast.

2. A spinning reel spool and spinning reel combination configured to eliminate the formation of fishing line 'birdnest' snarls that occasionally occur during casting when loops are formed in the fishing line during retrieval from the preceding cast of a lure and fishing line and to reduce the drag during casting by reducing friction between the fishing line and said spinning reel spool; said spinning reel comprising a body to house a mechanism that allows said spinning reel spool to pay out the fishing line freely when casting and to wind the fishing line onto said spinning reel spool to retrieve the fishing line following a cast and a bail including a bail guide movable between a first and second position pivotally mounted to said body to allow the fishing line to be cast unobstructed when in said first position and to engage the fishing line when in said second position to guide the fishing line onto said spinning reel spool with said bail guide during retrieval of the fishing line and lure; said spinning reel spool comprising an intermediate fishing line support member to store the fishing line thereon having an inner mounting member configured to mount said spinning reel spool on said body of said spinning reel and an outer fishing line retaining member to selectively retain at least a portion of the fishing line on said interconnecting fishing line support member; said outer fishing line retaining member including an outer face and an outer surface formed on the periphery of said outer fishing line retaining member; said outer surface formed on said periphery comprising an interrupted spool lip including at least two projections formed thereon each comprising a leading edge cooperatively forming a corresponding fishing line retaining seat with said interrupted spool lip to receive the fishing line therein to draw the fishing line across said outer face of said distal fishing line retaining member to prevent the formation of loops in the fishing line on said spinning reel spool to eliminate the formation of 'birdnest' snares during the subsequent cast.

3. The spinning reel spool of claim 2 wherein each said projection comprises a leading edge and a trailing edge.

4. The spinning reel spool of claim 3 wherein said leading edge and said trailing edge of adjacent projections are disposed near each other to cooperatively form a corresponding fishing line retaining seat therebetween.

5. The spinning reel spool of claim 4 wherein said leading edge and said trailing edge adjacent projections intersect to cooperatively form a corresponding fishing line retaining seat therebetween.

6. The spinning reel spool of claim 4 wherein each said leading edge comprises an inclined configuration and each said trailing edge comprises an arcuate edge to cooperatively form a tooth-like projection.

7. The spinning reel spool of claim 6 wherein friction created between said spinning reel spool and the fishing line during casting is reduced the fishing line contacting said arcuate trailing edges of said tooth-like projections to effectively reduce the contact surface as the fisherman casts the lure and the fishing line to move from peak-to-peak over said interrupted spool lip.

8. The spinning reel spool of claim 6 wherein when the bail guide is in the second position the fishing line slips to either side of the bail where the fishing line is guided onto said intermediate fishing line support member and wherein said interrupted outer surface of said spool lip eliminates loops formed when the bail pulls the fishing line over said outer face of outer surface of the distal or outer fishing line retainer member.

9. The spinning reel spool of claim 8 wherein said teeth-like projections prevent the fishing line from sliding in the direction of the reeling-on and only in the direction of the casting-off and the bail draws the fishing line onto two of said fishing line retaining seats pulling the fishing line taut over said outer face of said distal outer fishing line retaining member that as a consequence on the subsequent cast the fishing line pays out without the potential of a birdnest since no loop is allowed to form by under laying the fishing line on said interrupted outer surface of said spool lip causing the fishing line smoothly to pay out from said spinning reel spool.

10. A spinning reel spool for use on a spinning reel including a bail including a bail guide to reduce friction between the spinning reel spool and fishing line during casting and eliminate the formation of fishing line 'birdnest' snarls during casting that result from fishing line loops created during retrieval of the fishing line onto said spinning reel spool, said spinning reel spool comprising a fishing line support member to spool fishing line thereon and a distal fishing line retaining member including an outer face and an outer spool or lip formed on periphery of said distal fishing line retaining member thereof having a plurality of teeth-like projections extending outwardly therefrom to form a corresponding fishing line retaining seat formed at the intersection of each said projection and the surface of the outer spool lip formed on the periphery of said distal retaining member such that fishing line retrieved or reeled in engaging the center portion of the bail after a cast is drawing over said outer face of said distal retaining member by the bail the fishing line and engages two tooth-like projections and seated in the corresponding fishing line retaining seat pulling the fishing line against said outer face of said distal outer retaining member to prevent the formation of loops in the fishing line on said spinning reel spool to eliminate the formation of 'birdnest' snares during subsequent casts.

11. The spinning reel spool of claim 10 wherein said distal fishing line retaining member comprises a disk having an interrupted outer surface formed on said outer spool lip.

12. The spinning reel spool of claim 11 wherein each said projection comprises a leading edge and a trailing edge.

13. The spinning reel spool of claim 12 wherein each tooth-like member comprises an inclined leading edge.

14. The spinning reel spool of claim 13 wherein an arcuate trailing edge cooperatively forms an apex.

15. The spinning reel spool of claim 14 wherein the inclined leading edge and the arcuate trailing edge of adjacent teeth-like members intersect to cooperatively form a corresponding fishing line retaining groove.

16. The spinning reel spool of claim 15 wherein each said leading edge comprises an inclined configuration and each said trailing edge comprises an arcuate edge to cooperatively form a tooth-like projection.

17. The spinning reel spool of claim 16 wherein friction created between said spinning reel spool and the fishing line during casting is reduced the fishing line contacting said arcuate trailing edges of said tooth-like projections to effectively reduce the contact surface as the fisherman casts the lure and the fishing line to move from peak-to-peak over said interrupted spool lip.

18. The spinning reel spool of claim 17 wherein when the bail guide is in the second position the fishing line slips to either side of the bail where the fishing line is guided onto said intermediate fishing line support member and wherein said interrupted outer surface of said spool lip eliminates loops formed when the bail pulls the fishing line over said outer face of outer surface of the distal or outer fishing line retainer member.

19. The spinning reel spool of claim 18 wherein said teeth-like projections prevent the fishing line from sliding in the direction of the reeling-on and only in the direction of the casting-off and the bail draws the fishing line onto two of said fishing line retaining seats pulling the fishing line taut over said outer face of said distal outer fishing line retaining member that as a consequence on the subsequent cast the fishing line pays out without the potential of a birdnest since no loop is allowed to form by under laying the fishing line on said interrupted outer surface of said spool lip causing the fishing line smoothly to pay out from said spinning reel spool.

20. The spinning reel spool of claim 10 further including a proximal coupling member configured to mount said spinning reel spool on the spinning reel.

* * * * *